United States Patent [19]

Cros

[11] 4,149,092

[45] Apr. 10, 1979

[54] SYSTEM FOR CONVERTING THE RANDOMLY VARIABLE ENERGY OF A NATURAL FLUID

[75] Inventor: Pierre Cros, Paris, France

[73] Assignees: Spie-Batignolles; Societe Generale de Techniques et d'Etudes, both of Puteaux, France

[21] Appl. No.: 791,878

[22] Filed: Apr. 28, 1977

[30] Foreign Application Priority Data

May 11, 1976 [FR] France .................. 76 14151

[51] Int. Cl.² .................. F03B 13/10; B63H 13/00
[52] U.S. Cl. .................. 290/54; 290/55;
290/43; 290/44; 60/398; 417/334; 115/3; 115/34 A
[58] Field of Search .................. 290/42, 43, 44, 53, 290/54, 55, 52; 60/398; 417/334–336; 115/3, 39 A

[56] References Cited

U.S. PATENT DOCUMENTS

| 1,849,731 | 3/1932 | Nakatiani | 115/3 |
| 2,500,655 | 3/1950 | Bevins | 290/52 |
| 2,706,255 | 4/1955 | Breaux et al. | 290/55 |
| 3,269,121 | 8/1966 | Bening | 60/398 |
| 3,952,723 | 4/1976 | Browning | 417/334 |

FOREIGN PATENT DOCUMENTS 1038645  9/1958  Fed. Rep. of Germany ............ 290/44

*Primary Examiner*—Robert K. Schaefer
*Assistant Examiner*—John W. Redman
*Attorney, Agent, or Firm*—Young & Thompson

[57] ABSTRACT

Emitters and rotary hydraulic displacement pumps are associated with one or a number of propeller-type transducers and connected to receivers each having a rotary hydraulic displacement motor coupled to an alternator. The emitters are connected to the receivers by means of a hydraulic circuit for an auxiliary fluid which is admitted into at least one shunt-connected energy dissipator and the flow of which is regulated as a function of the random energy variations of the natural fluid. The energy-conversion system is primarily applicable to hydroelectric power plants of the stream or river type, to wind-driven power plants and to ship propulsion.

19 Claims, 10 Drawing Figures

SYSTEM FOR CONVERTING THE RANDOMLY VARIABLE ENERGY OF A NATURAL FLUID

This invention relates to a system for converting the variable energy of a natural fluid such as the water of a watercourse or atmospheric air into energy which has a regulated level. The invention is also concerned with a novel industrial product which makes this system suitable for a wide range of different applications including in particular stream or river power plants, wind-driven power plants and ship propulsion.

The energy-conversion systems of the type mentioned above are equipped with a rotary transducer for producing mechanical power, as a rule in order to drive a generator and produce electric power although other uses are also known. These systems accordingly present a problem of coupling between the transducer and the generator.

The known modes of coupling are usually of the mechanical type and comprise a multiplier which is intended to take into account the low speed of the transducer with respect to the nominal speed of the generator. This interposed device introduces a certain loss of power which cannot readily be recovered. Furthermore, the device is relatively costly to construct and of complex design; and a reduction in cost price of the device can be achieved only by reducing the multiplication ratio, thus making it necessary to adopt low-speed generators which are therefore higher in capital cost. It is further apparent that the rigidity of a coupling system of this type is such that surges at the time of start-up, synchronizing and tripping of the electric generator as well as vibrations in continuous operation are wholly transmitted to the power supply network.

It should also be noted that, when the generator is caused to operate at constant speed, complex devices have to be employed in order to maintain the overall efficiency in spite of random variations in the natural energy employed such as the flow of a watercourse or the speed of the wind. The devices can consist, for example, of turbines or propellers having a variable pitch. In the case of wind-driven power plants, it is a known practice to make use of a speed governor. A mechanism of this type, however, still permits of operation only within a relatively small range of wind velocity and is in any case both delicate and costly. It is found necessary at the high-velocity end of the range to ensure protection of the propeller by adopting propeller blades having a variable pitch, which in any case does not ensure full protection of the generator against a runaway condition. This is particularly regrettable since the developed power is proportional as a first approximation to the cube of this velocity.

Furthermore, a conversion system in accordance with this design constitutes a heavy and complex assembly entailing the need for bulb sets of the immersed generator type, heavy handling equipment and auxiliary units such as ventilating shafts and draining-off systems which are both costly and unsightly.

The practical impossibility of coupling a number of transducers with a single generator makes it necessary to design transducers having high power per unit but these latter mar the landscape, especially in the case of wind-driven generators. Alternatively, it becomes necessary to construct power generators which have a low power per unit and entail relatively higher investment costs.

A design concept which consists in driving a number of power generators simultaneously is not a practical proposition and the same applies to the recovery of the thermal power corresponding to losses of efficiency of the mechanical transmission system.

The aim of the present invention is to provide a power-conversion system which does not entail the need for any mechanical coupling means and consequently makes it possible to couple any number of transducers with any number of generators and to operate under optimum conditions of efficiency in spite of random variations in the input motive power. A further aim of the invention is to provide a system which entails moderate investment cost and which can therefore be readily integrated in the environment.

In accordance with the invention, the system for converting the variable energy of a natural fluid in motion such as the water of a watercourse or atmospheric air to power having a preset level comprises at least one rotary transducer immersed in the fluid and at least one power generator actuated by means of the transducer. The system essentially comprises an emitter having a rotary hydraulic displacement pump keyed on each transducer, at least one receiver having a rotary hydraulic displacement motor keyed on each power generator, a hydraulic circuit for an auxiliary liquid for connecting all the emitters to all the receivers, at least one device for dissipating the energy of the auxiliary liquid which is connected as a shunt off the hydraulic circuit, means for controlling the rate of flow of auxiliary fluid admitted into each of the shunt-connected dissipators, regulating means for regulating the circulation of the auxiliary liquid as a function of the random variations in energy of the natural fluid, and safety means for withdrawing at least a part of the system from service when certain critical quantities exceed predetermined values.

The hydraulic connection thus provided by the invention between transducers and generators results in a flexibility of operation which is considerably greater than that obtained with a mechanical coupling. Vibrations and operational shocks of various kinds are at least partially absorbed by a certain compressibility of the liquid. Damping of the shocks can also result from the elasticity of the hydraulic circuit casing to a certain extent.

The invention also makes it possible to connect a single generator of high unit power to a number of transducers of low power, with the result that a saving of capital cost is usually permitted. In the particular case of wind-driven power plants, it is accordingly possible to employ a number of wind-wheels of relatively small diameter in respect of a single alternating-current generator, thus providing considerable technical advantages and improving the appearance of site locations.

Furthermore, the relative positions of the transducers and of the generators are to some extent arbitrary so that, for example in the case of hydroelectric power plants of the river or stream type, it is no longer considered essential to immerse the electric generator as in the known bulb sets. This results in enhanced safety and in simplification of the structures as a result of suppression of certain ancillary units such as ventilation shafts or leakage extraction devices which are both costly and unattractive. Moreover, in this application, the immersed mass is reduced to a considerable extent.

Substantial operational faults which arise in particular at the time of tripping of an alternating-current generator and may result in a runaway condition of the turbine transducer and of the alternating-current generator are taken into account by the device for dissipating the hydraulic energy of the auxiliary liquid which is connected as a shunt off the hydraulic circuit. The receiver is then no longer supplied with liquid and the hydraulic resistance of the dissipator which can operate by throttling action, for example, prevents overspeed of the transducer. The energy which is dissipated in the form of heat is removed by a heat exchanger, preferably to an industrial or domestic utilization network.

Preferably, the system in accordance with the invention contains a coolant for the auxiliary liquid located in the low-pressure portion of the hydraulic circuit which serves to return the fluid from the receivers to the transducers. Said coolant is provided with a heat exchanger, also for removing the heat to an industrial or domestic utilization network. In the energy losses which are inherent in any transmission system and are normal occurrences in a mechanical system are thus recovered. In point of fact, in installations which have a fairly high power rating, these energy losses are liable to become considerable at absolute value, for example several tens of kilowatts in a medium-sized plant having a power rating of a few hundred kilowatts.

In the case in which the system comprises only one electric power generator, the receivers (in the event that there is more than one receiver) are keyed on the generator shaft and the system consists of a number of separate hydraulic circuits corresponding to the number of receivers. Each of these circuits has one or a number of emitters.

Preferably, the emitters are of a known type having axial pistons. It is known that these machines are reversible, with the result that the receivers are of the same type. In these machines, the relation between the rate of flow of auxiliary liquid and the speed of rotation depends on the inclination of the pistons with respect to the axis of rotation. This inclination is adjustable and, when the angle of inclination is zero, can accordingly correspond to a zero rate of flow. The ratio of respective speeds of the emitter and of the receiver can thus be varied at will.

In one advantageous embodiment of the invention, the means for controlling the flow rate of auxiliary liquid admitted into the energy dissipator which is connected to the circuit comprise a device having control valves which are calibrated in order to open automatically when the position of the means for adjusting at least one receiver or in other words the angle of inclination of the pistons corresponds to a zero rate of flow of the auxiliary liquid into the receiver irrespective of its speed if all the other receivers considered together are not capable of absorbing the entire flow delivered by the emitters.

The auxiliary fluid can escape only through the control valves and passes into the energy dissipator in which it undergoes a pressure drop which absorbs its entire hydraulic energy. In the event of tripping of the generator, this accordingly forestalls any tendency towards a runaway condition of all the devices which are connected together either mechanically or hydraulically: transducer, emitter, receiver and generator.

In a preferred embodiment of the invention, a tachometric dynamo is keyed on the generator shaft and its output signal is applied to an electric brake which is so arranged as to produce action on said shaft when the speed of rotation of this latter exceeds a predetermined value.

An additional protection having a very short response time against overspeed of the generator is thus made available.

In one advantageous embodiment of the invention, the output signal of the tachometric dynamo is applied to a stage which serves to control the means for adjusting the receivers in order to put said means in the position of zero delivery of auxiliary liquid when the speed of the generator shaft exceeds a predetermined threshold and thus to suppress any driving action of the auxiliary liquid on the generator.

By way of application, the invention is also concerned with a hydroelectric river or stream power plant. This power plant draws water from an upstream pond by means of a sluice-gate and restores the water to a downstream pond by means of at least one turbine transducer, an emitter being keyed on the shaft of said transducer and connected through a hydraulic circuit to at least one receiver which is keyed on the shaft of an electric power generator and the regulating means comprise in the case of each generator a power measuring stage such as a wattmeter which is connected at the output of the power generator. The output signal of the wattmeter is applied to a differentiating stage which supplies the derivative of the power with respect to the speed of one of the turbines and this derivative is compared with zero in a comparison stage. The result of the comparison is applied to a difference signal input of a regulating device, the action signal of which is applied to the regulating means for the receiver of the aforementioned turbine.

Said regulating means serve to modify the flow rate of auxiliary liquid at a constant speed of rotation of the generator in order to produce a speed of rotation of the turbine such as to ensure that the derivative aforesaid is zero or in other words that optimum efficiency is achieved. An arrangement of this type is particularly advantageous in the case in which the quantity of natural fluid in motion is superabundant. Under such conditions, the measured power of the wattmeter exhibits relatively little variation; if provision is made for a number of turbines and a number of receivers, it can accordingly be considered sufficient to carry out the regulation on one of these latter whilst the others are regulated for the most probable operating conditions.

In accordance with a preferred embodiment of this application, the hydroelectric power plant comprises a device for measuring the level in the upstream pond and a comparison stage for comparing the measured level with a predetermined reference value. The output of said comparison stage is connected to a second difference signal input of the regulating device which can be switched over with the first difference signal input.

It is thus possible by making use of the auxiliary liquid flow rate to modify the speed of rotation of the turbine in order to maintain the level in the upstream pond within a predetermined range which will usually be in the vicinity of the level of the spillway. This arrangement is found to be of the greatest value when the flow rate of available water is not superabundant and accordingly limits the production of electric power.

In accordance with a particular feature of this embodiment, the level difference signal is applied to means for controlling the valve in order to displace this latter as a result of a variation in the reference value applied to the comparison stage.

At the time of start-up of the installation, the control valve is progressively opened by utilizing the reference value input of the comparison stage aforesaid. By virtue of the connection with the regulating device, the same progressive action is produced simultaneously on the regulating means of the receiver, with the result that running-up to speed of the generator can also be progressive.

In accordance with one advantageous feature of this embodiment, the output signal of the tachometric dynamo is applied to means for controlling the valve in order to initiate closure of this latter when the speed of the power generator shaft exceeds a predetermined value.

Preferably, a certain number of pressure gages are mounted in the hydraulic circuit in order to emit a signal for initiating closure of the control valve when the pressure of auxiliary liquid falls below a predetermined threshold value. This accordingly guards against accidental failure of the hydraulic circuit which could result in a runaway condition of the turbine.

The invention is also concerned with an application of the above-mentioned system to a wind-driven electric power plant comprising a certain number of windwheels and an emitter keyed on each windwheel. These emitters are connected by means of a hydraulic circuit to at least one receiver which is keyed on the shaft of an electric generator.

In this application, the regulating means comprise a pressure gage branched on the hydraulic circuit in order to emit a signal which is applied to a signal input of a device provided with a reference value display input. The action signal of said regulating device is applied to a stage for controlling the regulating means of the receiver in order to maintain the pressure within the hydraulic circuit at a constant value by increasing the flow rate of auxiliary liquid within the receiver when the pressure aforesaid tends to rise.

When the wind velocity increases either in a durable manner or in a transient gust, the windwheel is accordingly accelerated and tends to increase the flow rate of the auxiliary liquid by means of the emitter and therefore to accelerate the generator. However, said generator is synchronized to the power system and rotates at constant speed, with the result that the increase in wind velocity produces a tendency to increase the pressure within the auxiliary circuit. The regulating means described in the foregoing accordingly have the effect of permitting a higher flow rate within the receiver at constant rotational velocity. The additional power supplied by an increase in wind velocity is therefore fully utilized without increasing the stresses on the windmill to any substantial extent.

If the wind velocity increases to such an extent that the regulating means of the receiver reach their end of travel, means are provided for automatically placing said regulating means in the zero-flow position, in which case the auxiliary liquid is diverted into the energy dissipator and the generator is no longer subjected to any hydraulic driving action.

In this application, the safety means comprise a temperature probe on the generator, a tachometric dynamo keyed on the generator shaft and a wattmeter branched off its output towards the power distribution network. These detectors emit an output signal which is applied to a threshold release and timing stage, the output of which is connected through a reversing stage to the control stage for the regulating devices of the receiver in order to put said means in the position of zero flow rate of the auxiliary fluid when the quantities measured by these detectors exceed predetermined values over a predetermined period of time.

The generator is thus effectively protected against incidents related to these quantities while preventing faulty operations arising from transient overshoots.

In one advantageous embodiment of the application mentioned in the foregoing, the safety means also comprise an electric brake keyed on the shaft of each windwheel, the control input of said brake being connected to an anemometer which is placed in the proximity of the corresponding windwheel.

In the event of particularly high wind which prevents any operation, the windwheel is thus prevented from rotating at an excessive speed which would have a hazardous effect on its resistance and length of service. Preferably, the anemometer produces action by means of a timing device in order to ensure that transient gusts of wind remain without effect.

As an advantageous feature, the safety means can also comprise a tachometric dynamo which is keyed on the shaft of each windwheel and connected to the corresponding brake.

In accordance with one alternative embodiment, the windwheel blades have a variable pitch and the anemometer is connected to the pitch-variation control device in order to initiate feathering of the blades when the wind velocity exceeds a predetermined value.

The invention is also concerned with the application of the system described above to a device for the propulsion of a ship.

In this application, the system of transducers comprises at least one windwheel and an emitter which is keyed on said windwheel and the system of power generators comprises at least one propeller.

In one particular embodiment of this application, the propulsion device comprises a single windwheel and two receivers which can be switched over to the emitter of said windwheel, each receiver aforesaid being keyed on the shaft of a propeller having different characteristics.

As a function of the wind velocity and of the desired speed of the ship, either of these two propellers can be put into operation in order to ensure that the efficiency of the propeller which is in service is as close as possible to the optimum value.

In another form of construction, the propulsion device comprises an auxiliary heat engine and an emitter which is keyed on the shaft of said engine, said emitter being connectable to the circuit which connects the emitters of the windwheels to the receivers.

In the event of a flat calm, it is only necessary to carry out the above-mentioned switching operation in order to propel the ship by means of the engine.

Preferably, the emitter which is keyed on the heat engine comprises regulating means for defining an adjustable relation between the speed of rotation of the engine and the rate of flow of auxiliary liquid through said emitter.

Further distinctive features and advantages of the invention will become apparent from the following detailed description, reference being made to the accompanying drawings which are given by way of example without any limitation being implied, and in which.

Figure 1:
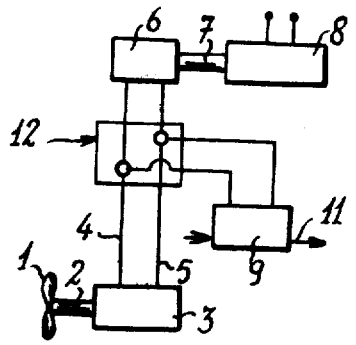
FIG. 1 is a general arrangement diagram of a system in accordance with the invention in a simple form comprising a single emitter and a single receiver.

Reference being made to FIG. 1, the energy-conversion system in accordance with the invention comprises in its simplest form a propeller transducer 1 which is keyed on the shaft 2 of a rotary hydraulic pump 3, said pump being intended to constitute an emitter. The emitter 3 is connected by means of two pipes 4, 5 to receiver 6 constituted by a rotary hydraulic motor which is keyed on the shaft 7 of a power generator 8 consisting, for example, of an electric generator.

During operation, the transducer 1 which is immersed in a natural fluid in motion such as the water of a water-course or atmospheric air drives the emitter 3 by means of the shaft 2 in order to cause an auxiliary liquid consisting of a suitable oil, for example, to flow within the pipes 4, 5.

The flowing liquid actuates the receiver 6 which in turn actuates the generator 8 by means of the shaft 7.

The system further comprises an energy-dissipating unit 9 which is connected as a shunt off the receiver 6. This unit is based on a known principle of operation and does not in itself form part of the invention. The dissipator comprises means for powerfully throttling the flow of auxiliary liquid which passes through the unit in order to convert the greater part of the hydraulic energy of the auxiliary liquid into heat, and means for removing this heat by means of a heat-transporting fluid 11.

The energy dissipator 9 is connected to the pipes 4, 5 by means of a device comprising control valves 12 which are normally closed. However, these valves are calibrated so as to open automatically if the auxiliary liquid is prevented in any way from circulating within the receiver 6. The circulation then takes place between the emitter 3 and the dissipator 9.

Figure 2:
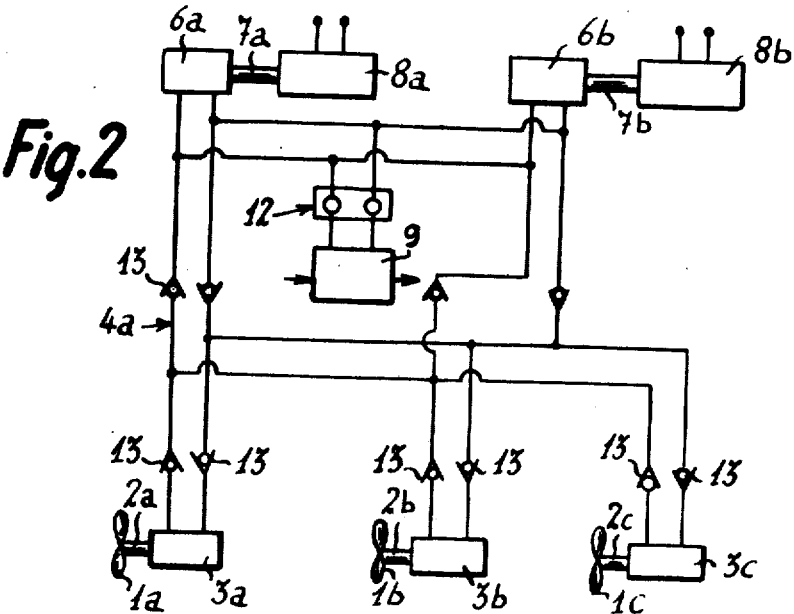
FIG. 2 is a general arrangement diagram of the system but in a more complex form comprising a plurality of emitters and a plurality of receivers.

The diagram of FIG. 2 is similar to that of FIG. 1 but shows a more complex embodiment of the invention comprising a plurality of emitters and a plurality of receivers.

For example, three transducers 1a, 1b, 1c are keyed respectively on three emitters 3a, 3b, 3c. These emitters are connected by means of a piping system 4a to two receivers 6a, 6b which are in turn keyed on the respective shafts of two generators 8a, 8b. Check valves 13 are mounted in the pipes 4a in order to prevent the auxiliary liquid from flowing back in an undesirable direction in the event of hydraulic unbalance of the circuit as a whole. One check valve is placed in each inlet and in each outlet of the emitters and receivers.

An energy dissipator 9 is connected as a shunt off the hydraulic circuit formed by the pipes 4a by means of calibrated control valves 12.

Without thereby departing from the scope of the invention, it would clearly be possible to devise a system comprising any desired number of transducer-emitters and any desired number of receivers.

The operation is the same as in FIG. 1 but, in this case, each emitter transmits a proportion of the total energy to be converted which may be variable and each generator also delivers a proportion of the total energy.

If for any reason the auxiliary liquid cannot circulate within one or a number of receivers, said liquid circulates in excess within the other receivers if this is permitted by operating conditions. If not, said liquid is diverted into the energy dissipator 9.

The systems described with reference to FIGS. 1 and 2 further comprise regulating devices (not shown in the drawings) which constitute means for obtaining regulated-level energy at the output of the generators whereas the energy of the fluid in which the propeller transducers are immersed is assumed to be intermediate. These regulating devices (not shown in the drawings) will be described hereinafter.

The emitters such as those designated by the reference 3 and the receivers such as those designated by the reference 6 are of known type and do not in themselves form part of the invention. However, in order to gain a clearer understanding, a brief description of these latter will be given below with reference to FIGS. 3 and 4.

In the examples herein described, these machines are of the axial piston or drum type developed in Great Britain by Janney and in Germany by Thoma.

Figure 3:
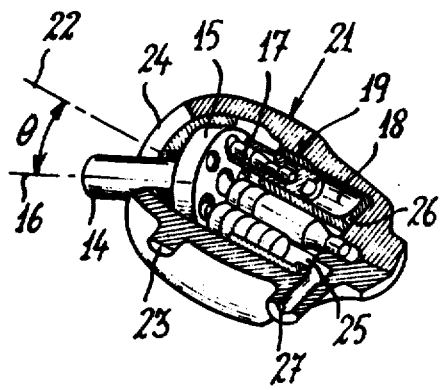
FIG. 3 is a part-sectional view in perspective showing a first example of an emitter or a receiver.
Figure 4:
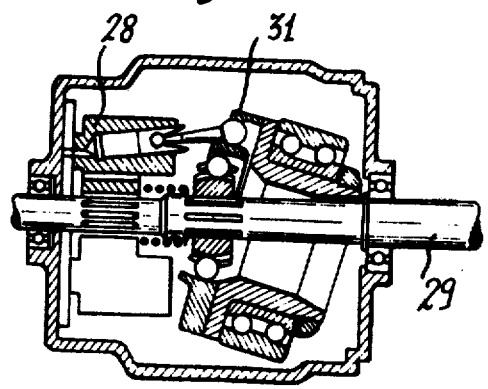
FIG. 4 is a sectional view of a second example of an emitter or a receiver.

In a first type of machine designated as an inclinable cylinder block (as shown in FIG. 3), the machine comprises a shaft 14 terminating in a flange-plate 15 at right angles to the axis 16 of the shaft 14. Pistons 17 are attached to the flange-plate 15 by means of knuckle-joints and are slidably mounted within cylinders 18 formed in a cylinder block 19 which is in turn rotatably mounted within a casing 21. The axis 22 of the casing 21 can be inclined to the axis 16 of the shaft 14 at a variable angle $\theta$. The casing 21 is pivotally mounted on pins 23 and a hollowed-out portion 24 permits angular displacement of the shaft 14. Orifices 25, 26 are formed in the ends of the cylinders 18 in order to come into coincident relation during the movement of rotation of the cylinder block 19 with an admission orifice 27 of the casing 21 or a discharge orifice (not shown).

During operation, the casing 21 remains stationary whilst the movement of rotation of the shaft 14 causes the assembly consisting of pistons 17 and cylinder block 19 to rotate about the axis 22 and also produces at the same time a pumping movement of the pistons 17 within the cylinders 18, thus resulting in a flow of auxiliary liquid between the inlet 27 and the outlet of the machine.

In the case of a given speed of rotation of the shaft 14, the flow rate of auxiliary liquid is higher as the angle $\theta$ is larger. By modifying the angle $\theta$, the relation between the flow rate and the speed can thus be varied at will. If the angle θ is zero, the flow rate is zero irrespective of the speed of rotation of the shaft 14.

In a second type of machine designated as an inclinable flange-plate machine (shown in FIG. 4), the cylinder block 28 always remains coaxial with the drive shaft 29 and the angle of inclination of the flange-plate 31 is adjusted at will. The operation is equivalent but an additional feature is provided in this case by the shaft 29 which emerges on both sides of the machine.

These machines are reversible in that the movement of rotation of the shaft initiates a flow of auxiliary liquid and, conversely, a flow of auxiliary liquid initiates rotation of the shaft. It is for this reason that machines of this type will constitute both receivers and emitters in the examples which will be given in the following description.

Referring now to FIGS. 5 to 8, a first embodiment of the invention as applied to a hydroelectric river or stream power plant will now be described.

Figure 5:
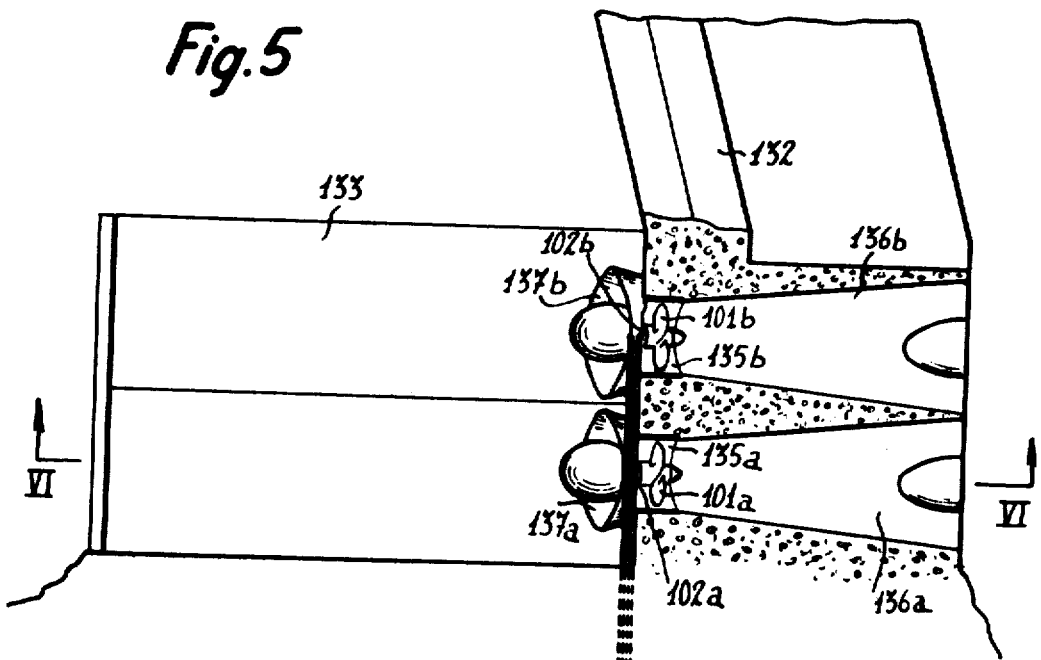
FIG. 5 is a part-sectional plan view of a hydroelectric power plant which makes use of a system in accordance with the invention.
Figure 6:
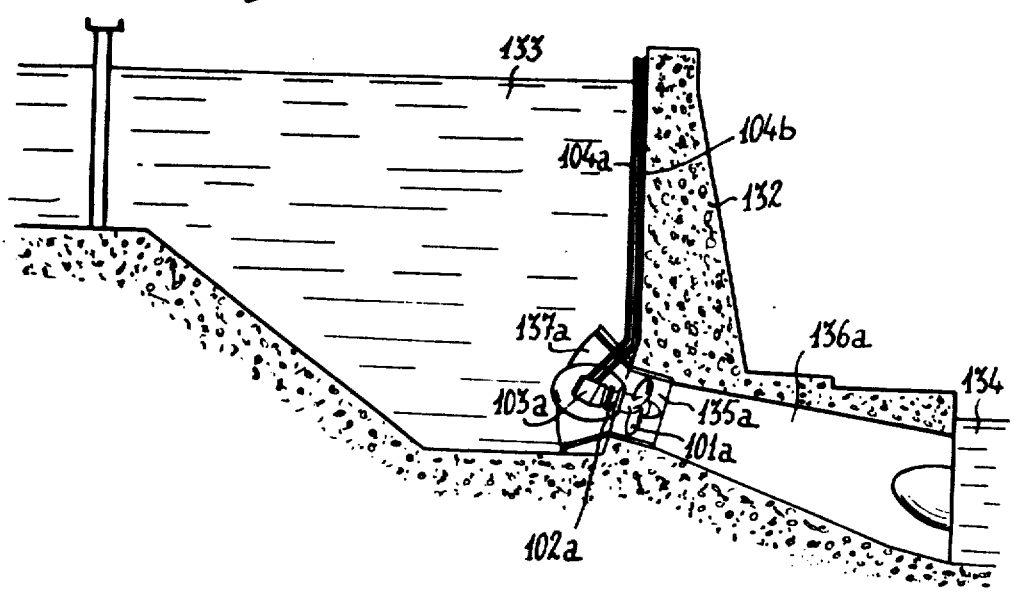
FIG. 6 is a sectional view taken along line VI—VI of FIG. 5.
Figure 7:
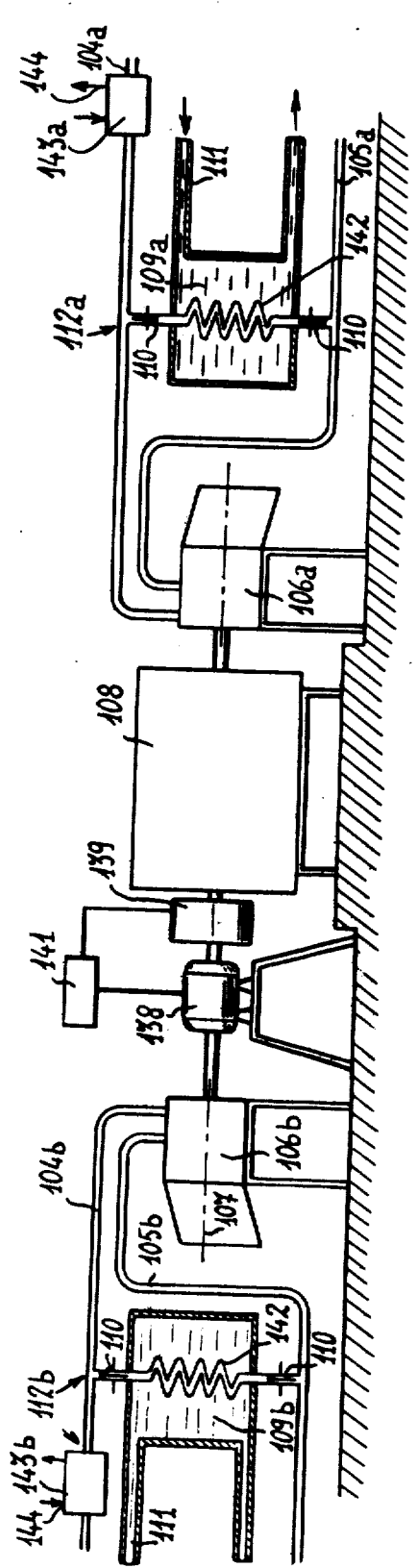
FIG. 7 is a semi-diagrammatic part-sectional view in elevation taken along line VII—VII of FIG. 5.

Reference being made to FIGS. 5 to 7, a dam 132 forms a separation between an upstream pond 133 and a downstream pond 134. At the base of the dam 132, two turbines 101a, 101b are mounted within respective orifices 135a, 135b of the dam which are extended towards the downstream pond 134 by diffusers 136a, 136b. These turbines are associated with stationary vanes 137a, 137b.

Emitters 103a, 103b respectively are keyed on the shafts 102a, 102b of the turbines 101a, 101b. In the example herein described, said emitters are axial-piston machines and can be of the two types described above.

Each emitter 103a, 103b is connected to a receiver 106a, 106b by means of a pair of pipes designated respectively by the references 104a, 105a and 104b, 105b.

The receivers 106a, 106b are keyed at the end of a line of shafts 107 comprising the shaft of an alternator 108 and the shaft of a tachometric dynamo 138. There is also keyed on the shaft of the alternator 108 an electric brake 139 which is connected to the output of the dynamo 138 by means of a threshold device 141 which is arranged in known manner so as to initiate action of the brake 139 when the speed of the line of shafts 107 exceeds a predetermined value.

An energy dissipator 109a, 109b is mounted as a by-pass across each pair of pipes 104a, 105a and 104b, 105b which terminate at the receivers 106a, 106b.

In accordance with known arrangements, said dissipator comprises a circuit 142 having a very high hydraulic resistance for the auxiliary liquid, this resistance being calculated so as to absorb the greater part of the hydraulic energy of the auxiliary liquid and to convert it to heat. In addition, a stream 111 of heat-transporting fluid passes through the dissipator in order to remove this heat, for example towards a utilization circuit.

Each energy dissipator 109a, 109b is connected to corresponding pipes by means of devices 112a, 112b having calibrated control valves such as the valve 110. Said control valves are calibrated so as to open automatically and to admit the auxiliary liquid into the dissipator when the corresponding receiver is so adjusted that the flow rate of hydraulic fluid which is admitted therein is zero or substantially zero.

An auxiliary-liquid cooling unit 143a, 143b is placed on one of the two pipe branches which terminates in each of the receivers 106a, 106b. Said cooling unit is preferably placed in the return pipe 104a, 104b to the emitter which is at a lower pressure and comprises in known manner a heat exchanger through which passes a stream 144 of heat-transporting fluid in order that the heat extracted from the liquid may be removed and transferred to a utilization circuit.

Figure 8:
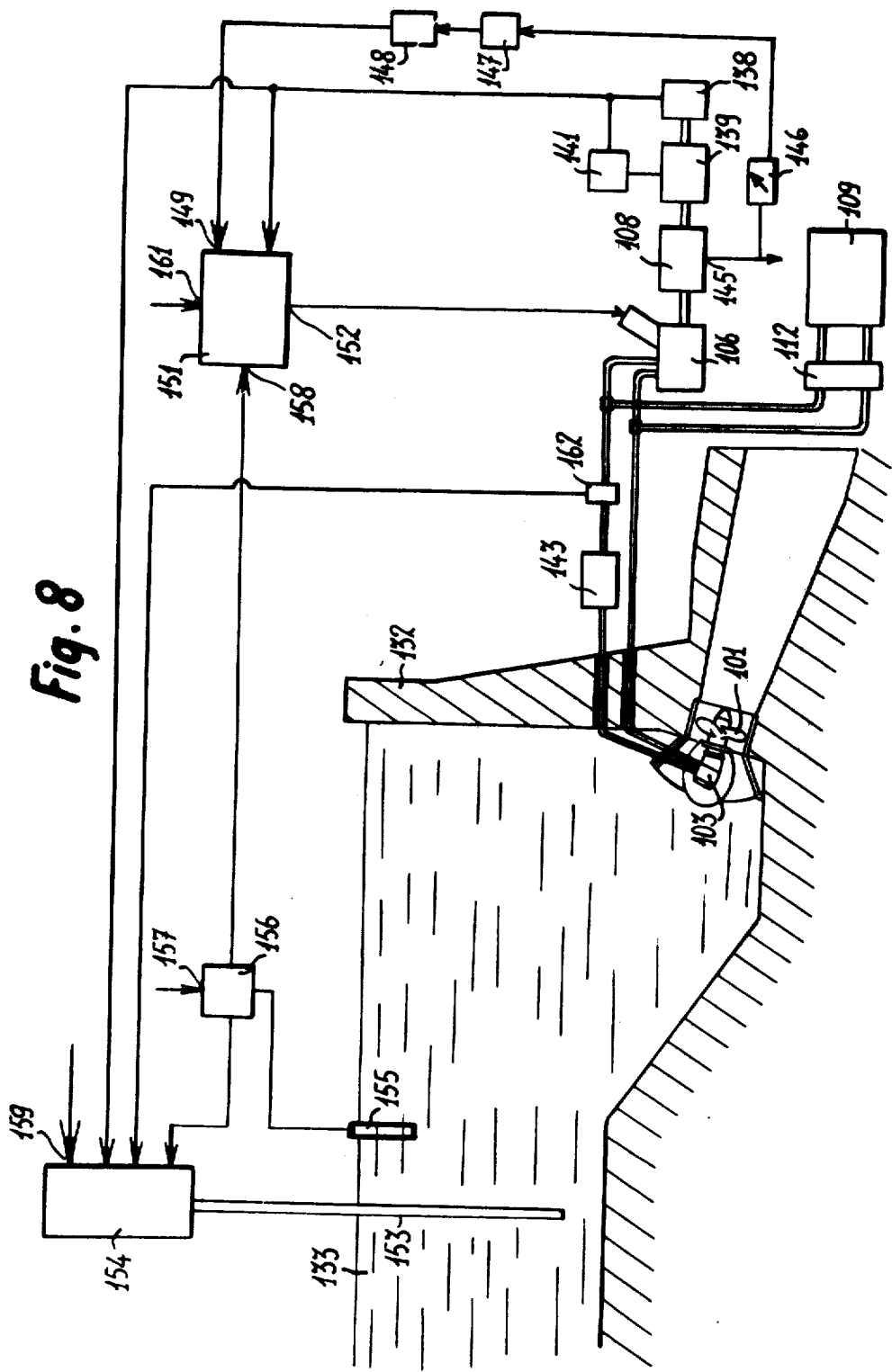
FIG. 8 is a diagrammatic view of the power plant of FIG. 5 in which the regulating stages are also shown.

The hydroelectric power plant which has just been described further comprises a certain number of regulating stages which will now be described with reference to the semi-diagrammatic drawing of FIG. 8 which shows for the sake of enhanced clarity only a single turbine 101 together with its emitter 103 and a single receiver 106 which is connected to the emitter 103.

A wattmeter 146 is connected to the output 145 of the alternator 108 to the power distribution network. The measuring signal produced by said wattmeter is applied to the input of a differentiating stage 147 which is arranged in known manner so as to produce at the output a signal representing the derivative of the electric power with respect to the speed of rotation of the turbine 101. For this operation, a signal representing the speed of the turbine must also be applied to the differentiator 147. This arrangement has not been illustrated but it is within the capacity of anyone versed in the art to measure the rate of flow of auxiliary liquid which represents the speed of rotation of the turbine in respect of a given angle of inclination of the emitter pistons.

The derivative aforesaid is applied to a comparison stage 148 in which it is compared with zero. The result constitutes a difference signal which is applied to a first difference signal input 149 of a regulating device 151. The action signal of said device which is emitted at 152 is applied through a servomechanism of known type to the regulating means of the receiver 106, that is, to the variable-inclination element of said receiver.

In the upstream pond 133, a sluice-gate 153 is connected to a control device 154 which is adapted to place said gate in three positions corresponding to openings of one-third, two-thirds and the fully open position.

A level-measuring probe 155 emits a signal towards a comparison stage 156 in which said signal is compared with a reference value which is applied to an input 157 in order to produce a difference signal which is applied to a second difference signal input 158 of the regulating device 151.

The difference signal is also applied to the control device 154 of the sluice-gate 153, thus making it possible to vary the position of said sluice-gate by producing action on the input 157 of the comparison stage 156.

The control device 154 of the sluice-gate and the regulating device 151 each have a manual control input (the inputs 159 and 161 respectively) which permit operation of the sluice-gate and of the regulating means of the receiver by remote control.

Finally, the signal produced by the tachometric dynamo 138 is applied not only to the threshold device 141 but also to one input of the regulating device 151 in order to cause this latter to emit an action signal which tends to place the regulating means of the receiver 106 in the position of zero delivery of auxiliary liquid when the speed of the alternator exceeds a predetermined value. The signal produced by the dynamo is also applied to the device 154 for controlling the sluice-gate 153 in order to initiate closure of said gate under the same conditions.

A certain number of pressure gages such as the gage 162 are so arranged as to measure the pressure of the auxiliary liquid within the pipes 104, 105 of the hydraulic circuit. These pressure gages are provided with means for transmitting a signal to the control device 154 of the sluice-gate 153 in order to initiate closure of the gate if the pressure within the hydraulic circuit falls to a value in the vicinity of atmospheric pressure.

The operation of this installation will now be described essentially with reference to FIG. 8, that is to say by considering a single emitter-receiver pair and by using reference numbers without letter indices. The explanation will thus be simplified without thereby affecting its general field of application since, in the case of FIGS. 5 to 7, the hydraulic emitter-receiver circuits are completely separate and operate in an identical manner independently of each other.

During normal operation, the water of the upstream pond 133 which flows through the turbine 101 initiates rotation of the shaft 102 of the coupled emitter 103. As explained earlier with reference to FIG. 1, this movement of rotation utilizes the flow of auxiliary liquid in order to induce rotation of the receiver 106 and of the alternator 108 which is connected to the distribution network. The energy dissipator 109 is short-circuited by means of the device 112 comprising calibrated valves.

Energy losses due to transmission which correspond in known installations to mechanical losses arising from friction are all reduced in this case to pressure drops within the pipes 104, 105, the effect of which is to heat the auxiliary liquid. The cooling unit 143 makes it possible to recover this energy which is not negligible in large installations.

The wattmeter 146 measures the power delivered to the distribution network and a signal representing the value of the derivative of said power with respect to the speed of the turbine 101 is applied by means of the stages 147 and 148 to the first difference signal input 149 of the regulating device 151.

Furthermore, the comparison stage 156 produces a signal representing the difference between the level in the upstream pond determined by the probe 155 and a reference value indicated at the input 157. Said signal is applied to the second difference signal input 158 of the regulating device 151.

In a first mode of operation which can be employed especially when the water to be passed through the turbine is superabundant and flows over the spillway of the dam 132, the difference signal input 158 is put out of service and the regulating device 151 is made dependent on the difference signal delivered by the wattmeter 146. The action signal emitted by the device 151 therefore tends to place the regulating means of the receiver 106 in a position which ensures that the auxiliary liquid flow rate corresponds to a speed of the turbine 101 such that the derivative of the electric power with respect to said speed is zero. The conditions of maximum power are then fulfilled.

In the case of an installation comprising two turbines (as shown in FIGS. 5 to 7), the regulating means can be split up in order to operate both turbines or a more simple expedient consists in producing action on only one turbine by means of the receiver which is connected thereto whilst the other turbine rotates at constant speed.

In a second mode of operation which can be adopted on the contrary when the available flow of water is limited and when it is desired to maintain the level in the upstream pond 133 within a fixed range, for example at a level flush with the spillway, the difference signal input 149 of the regulating device 151 is cut out of circuit, with the result that said device is made dependent on the water level in the upstream pond or more exactly on the difference between said level and a predetermined reference value. The action signal emitted by the regulating device 151 tends to place the regulating means of the receiver 106 in a position such that the auxiliary liquid flow rate corresponds to a speed of the turbine 101 which makes it possible to maintain the reference level which has been chosen in spite of any random variations in the supply of water to the upstream pond.

If the alternator 108 pulls out of step with the network for any reason and runs at overspeed, the techometric dynamo 138 which is responsive to said overspeed delivers a closure order to the control device 154 of the sluice-gate 153. This closing action is fairly slow and does not represent a major disadvantage in regard to the turbine 101 which rotates at a relatively low speed but could be attended by serious consequences in regard to the alternator 108. In point of fact, the dynamo drives the regulating device 151 at the same time and this latter emits an action signal which places the regulating means of the receiver 106 in the position of zero delivery of auxiliary liquid. The receiver 106 is no longer subjected to any rotational action by the auxiliary liquid. Since it no longer has any means of escape, said auxiliary liquid thrusts back the calibrated valves of the device 112 and then passes through the energy dissipator 109 as long as the sluice-gate 153 is not closed.

Furthermore, the electric brake 139 which is actuated by the dynamo initiates a brake action which is even faster than the two preceding actions and is also capable of compensating for imperfections in positioning of the regulating means of the receiver.

Start-up of the installation is carried out by placing the sluice-gate 153 in the position of one-third opening by making use of the control input 157 and by placing the regulating means of the receiver 106 in the position of maximum angle $\theta$ by means of the manual control input 161 of the regulating device 151.

The turbine 101 begins to rotate and drives the alternator 108 at low speed by reason of the value of the angle $\theta$.

The value of the angle $\theta$ is then progressively reduced by means of the manual control input 161 of the regulating device 151 until the alternator attains its speed of synchronization with the distribution network.

Once synchronization has been established, the sluice-gate 153 is then opened to the full extent either by utilizing the manual control input 159 of the control device 154 or by utilizing the manual input 157 of the comparison stage 156.

Once the sluice-gate has been opened, one of the two modes of operation described in the foregoing can then be adopted.

As can readily be understood, all the start-up operations which have just been described can be made automatic in known manner.

Apart from the possibility of tripping which has already been mentioned, the only incidents of operation which are liable to occur are those arising from failure of the hydraulic circuit piping which would be liable to cause a runaway condition of the turbine 101. A failure of this type results in an instantaneous drop in pressure of the auxiliary liquid which initiates closure of the sluice-gate by means of the pressure gages 162 in a sufficiently short time to prevent such a runaway condition.

The hydroelectric power plant which has just been described offers many advantages over known power stations of the same type, namely the so-called river or stream power plants. In the first place, no electrical element is immersed, with the result that all danger of short-circuiting which is inherent in an arrangement of this type is accordingly removed together with all the usual requirements such as unattractive ventilation shafts and devices for pumping seepage water. Furthermore, handling of immersed elements in this case involves only the turbine and the associated emitter which form a much more compact and lightweight assembly than a turbo-alternator unit constituting a bulb set.

In the second place, by reason of the choice of hydraulic machines, the speed of the turbine is not related to that of the alternator by means of a multiplier having a fixed ratio but can on the contrary be adjusted at any moment to the flow rate of water which passes through the turbine in order to obtain the highest efficiency whilst the speed of the alternator remains the speed of synchronization with the distribution network.

It is also possible to relate the speed of the turbine to determination of a constant level in the upstream pond.

Finally, the hydraulic connection provides considerable flexibility of operation which prevents propagation of all operational shocks and vibrations.

Figure 9:
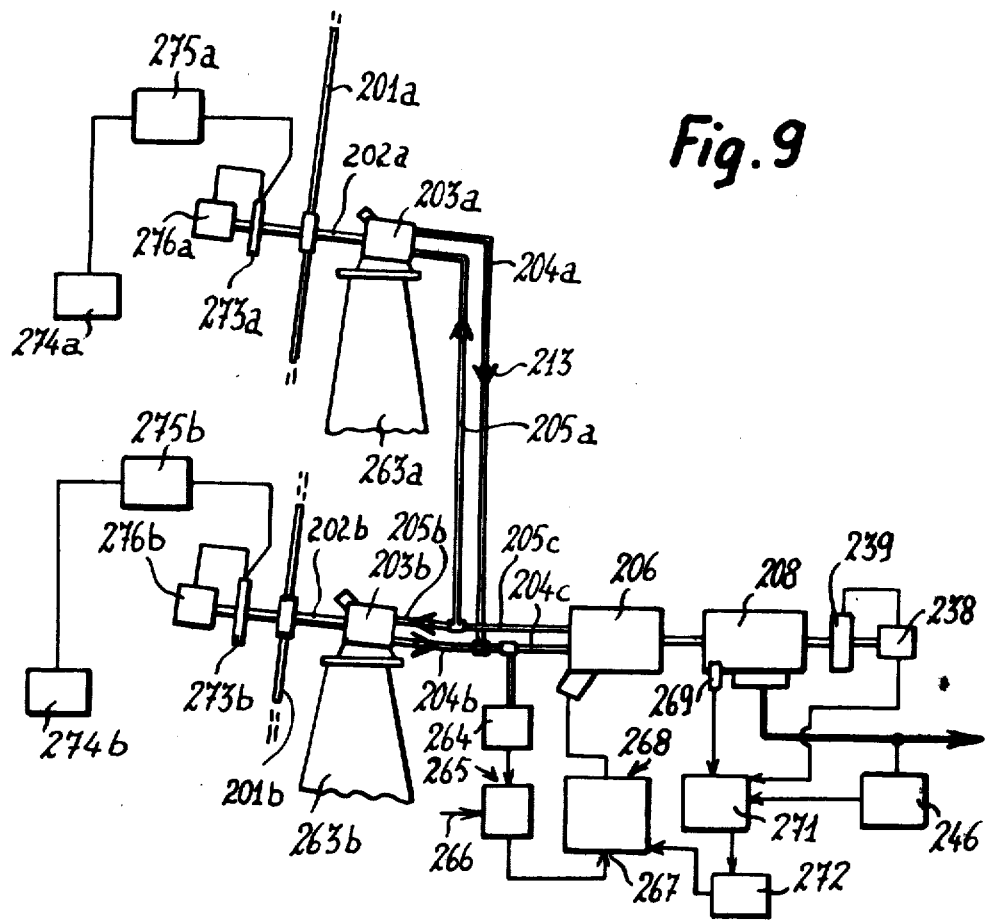
FIG. 9 is a diagrammatic view in elevation showing a wind-driven electric power plant which utilizes a system in accordance with the invention, the regulating stages being also indicated.

Referring now to the semi-diagrammatic drawing of FIG. 9, there will be described a second application of the invention which relates to a wind-driven electric power plant.

Two windwheels 201a, 201b are mounted on towers 263a, 263b respectively by means of orientable systems of known type. An emitter 203a, 203b of the same type as those described earlier is keyed on the shaft 202a, 202b of each windwheel.

A pair of pipes designated respectively by the references 204a, 205a and 204b, 205b extends from each emitter. These two pairs of pipes are mounted in parallel and joined together to form a single pair 204c, 205c which terminates in a receiver 206. Said receiver is advantageously of the same type as the emitters and keyed on the shaft of an alternator 208.

Check valves 213 are placed on the first two pairs of pipes in order to prevent direct circulation between the two emitters 203a, 203b.

At one point of one of the two pipes 204c, 205c, there is connected a pressure gage 264 fitted with a transmission device, the signal of which is applied to a signal input of a regulating device 265 which is also provided with a reference value display input 266. The action signal of the regulating device 265 is applied to an input 267 of a control stage 268 of the regulating means of the receiver 206. The arrangement of the regulating means aforesaid is such that said means tend to increase the flow rate of auxiliary liquid within the receiver 206 by increasing the angle $\theta$ of its pistons when the pressure tends to increase within the hydraulic circuit.

Safety means comprise a thermal probe 269 applied at a suitable point of the alternator 208, a wattmeter 246 branched on the output of the alternator to the distribution network, and a tachometric dynamo 238 keyed on the alternator shaft. These three detectors are connected to a threshold release and timing stage 271, the output of which is connected through a reversing device 272 to the control stage 268 of the regulating means of the receiver 206.

Moreover, the control stage 268 comprises means which are responsive to the regulating means of the receiver 206 as these latter come into the position of maximum flow rate in order to ensure that said regulating positions are then automatically placed in the zero-delivery position.

An electric brake 239, the control input of which is connected to the tachometric dynamo 238, is also keyed on the shaft of the alternator 208.

An electric brake 273a, 273b is keyed on the shaft of each windwheel 201a, 201b. The control input of said brake is divided into two and connected on the one hand to an anemometer 274a, 274b placed in the vicinity of the corresponding windwheel through a timing device 275a, 275b and on the other hand to a tachometric dynamo 276a, 276b which is keyed on the shaft of each windwheel.

The installation further comprises an auxiliary liquid cooling unit mounted on the pair of pipes 204c, 205c and an energy dissipator mounted as a by-pass off these two pipes. For the sake of greater clarity, these elements are not shown in the drawings but are arranged in the same manner as in the embodiments described earlier.

During normal operation, the wheels 201a, 201b which are actuated by the wind impart rotational motion to the emitters 203a, 203b respectively. This results in flowing streams of auxiliary liquid within the pairs of pipes 204a, 205a and 204b, 205b respectively. These flowing streams are combined within the single pair 204c, 205c in order to drive the receiver 206 and the alternator 208 in rotation. The check valves 213 cause the auxiliary liquid to circulate between each emitter and the receiver and not directly between the two emitters.

If the wind velocity increases, the movement of rotation of the windwheels accelerates and the flow rate of auxiliary liquid tends to increase but would be prevented by the constant speed of the receiver 206, said receiver being keyed on the alternator 208 which is in synchronism with the distribution network. This results in an increase in pressure within the hydraulic circuit which makes use of the regulating device 265 and the control stage 268 in order to place the regulating means of the receiver 206 in a position of higher delivery and thus to maintain the pressure at a constant value. The excess energy which is available as a result of an increase in wind velocity is therefore absorbed and converted.

If the wind velocity increases until the regulating means of the receiver 206 reach the end of travel, said regulating means are accordingly placed in the position of zero delivery by the control stage 268, thus suppressing any driving action of the auxiliary liquid on the receiver 206 and preventing tripping and racing of the alternator. The auxiliary liquid is then diverted into the energy dissipator.

In the event of incidents related to an abnormal temperature rise of the alternator either at overspeed or at an unduly high level of electric power, the respective detectors 269, 238 and 246 have the same effect of placing the regulating means of the receiver 206 in the zero-delivery position by means of the threshold release and timing stage 271. However, the time-delay effect prevents accidental actions on transient overshoots.

Connection of the electric brake 239 to the tachometric dynamo 238 achieves a further improvement in the conditions of speed regulation of the alternator.

In the event of a steady high wind, the windwheels can be braked by the action of anemometers 274a, 274b in order to prevent any overspeed which would be liable to endanger the resistance of the windwheels.

Said anemometers are connected to the brakes 273a, 273b and placed in the vicinity of the windwheel with which they are coupled in order to take precise local wind conditions into account.

In an alternative embodiment which is not illustrated, the blades of the windwheels have a variable pitch and the anemometers are connected to the respective devices for controlling the variation of pitch in order to feather the blades in the event of an excessively high wind.

The timing devices 275a, 275b serve to prevent any accidental action of the anemometers in the event of a transient gust of wind.

The tachometric dynamos 276a, 276b which also produce action on the brakes 273a, 273b make it possible to prevent overspeeds which arise from other causes such as failure of the hydraulic circuit. Furthermore, the brakes 273a, 273b make it possible to slow-down the windwheels under all circumstances, for example by means of a remote control system for putting them into service.

A wind-driven electric powr plant of the type hereinabove described makes it possible to obtain outstanding power efficiency by reason of the fact that the transducer is free to operate over a wide range of speeds of rotation, these speeds being essentially a function of the wind velocity which is highly variable. The higher efficiency which is thus achieved also arises from the fact that the energy supplied by a number of windwheels can be collected in a single hydraulic circuit which is capable of absorbing a substantial addition of power. Finally, as in the previous application, the greater part of transmission losses is recovered by cooling of the auxiliary liquid.

Furthermore, the flexibility of operation of a system of this type and its low susceptibility to shocks and gusts of wind make it possible to obtain a higher power output from a windwheel having predetermined geometrical characteristics in comparison with the power obtained by making use of mechanical speed governors which are in addition distinctly most costly and delicate.

Finally, the possibility of mounting a large number of windwheels of small size on a single high-power alternator avoids any adverse effect on the appearance of sites and also circumvents the problems created by structures having large dimensions.

Figure 10:
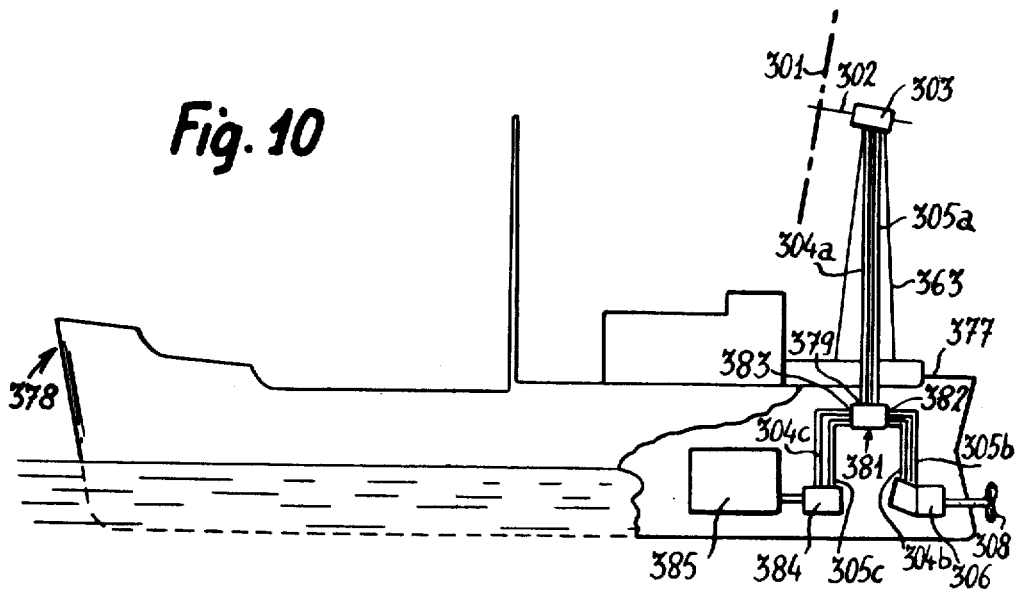
FIG. 10 is a semi-diagrammatic view in elevation showing a system in accordance with the invention as applied to the propulsion of a ship.

Reference being made to FIG. 10, there will now be described a third application of the invention which relates to a device for the propulsion of a ship.

An orientable windwheel 301 is mounted on a mast 363 fixed on the deck 377 of a ship 378. An emitter 303 of the same type as those described earlier is keyed on the shaft 302 of said windwheel.

A pair of pipes 304a, 305a connects the emitter 303 to an input 379 of a device having three channels 381, the output 382 of which is connected by means of a pair of pipes 304b, 305b to a receiver 306 of the same type as the emitter 303. A propeller 308 is keyed on the shaft 307 of said receiver.

Another input 383 of the three-channel device 381 is connected by means of a pair of pipes 304c, 305c to an emitter 384 which is keyed on the shaft of a heat engine 385 such as a Diesel engine.

Preferably, the shaft 302 of the windwheel is fitted with an electric brake (not shown in the drawings) which can be actuated by means of a tachometric dynamo as in the embodiment described earlier.

During operation, the three-channel device 381 being positioned in such a manner as to connect the emitter 303 to the receiver 306, the rotation of the windwheel 301 initiates the rotation of the propeller 308 by means of the hydraulic transmission system. The ship 378 can then travel forward regardless of its course with respect to the direction of the wind by reason of the orientability of the windwheel 301. When this latter is stationary, it is only necessary to orient the plane of said windwheel in a direction parallel to the wind.

In the event of a dead calm or of excessively violent wind which prevents the use of the windwheel, the emitter 384 is connected to the receiver 306 and the ship moves forward by means of the heat engine.

In the event of insufficient wind velocity, the energy contribution of the engine 385 can be regulated at will be means of the three-channel device 381. By producing action on the regulating means of the emitter 384, it is also possible to adjust the speed of the heat engine 385 to its value of optimum efficiency irrespective of the flow rate of auxiliary liquid which this emitter is required to produce.

In the event of a transient gust of wind, running of the windwheel at overspeed is inhibited by the electric brake which is mounted on the shaft of this latter.

The propulsion device which is constructed as described in the foregoing permits a remarkable saving of power without involving any of the hazards of sailing under canvas. Furthermore, by virtue of the fact that it is possible to vary the ratio of speeds of the windwheel and of the propeller by utilizing the regulating means especially of the receiver 306, the device permits continuous operation in the vicinity of maximum output.

In accordance with an alternative design (not shown in the drawings), a second propeller having characteristics which are different from the first is fitted with a receiver which can be switched over to the emitter 303. This accordingly increases the optimum operating range according to the variable force of the wind.

In ships of large size having a free deck area such as oil tankers, it is an advantage to provide a bank of several windwheels which are arranged as in the case of the wind-driven power plant described earlier.

As can readily be understood, the invention is not limited to the embodiments which have been described in the foregoing and which have been given solely by way of example. On the contrary, the scope of the invention extends to any alternative form, especially in regard to various combinations of emitters and receivers or in regard to different arrangements of the regulating stages. Applications in fields other than those mentioned can also be contemplated.

We claim:

1. A system for converting the variable energy of a natural fluid in motion such as the water of a watercourse or atmospheric air into energy which has a regulated level, comprising at least one rotary transducer immersed in the fluid and at least one regulated-level power generator actuated by means of the transducer, wherein said system comprises an emitter having a rotary hydraulic displacement pump keyed on each transducer, at least one receiver having a rotary hydraulic displacement motor keyed on each power generator, a hydraulic circuit for an auxiliary liquid which connects all the emitters to all the receivers, a device for dissipating the energy of the auxiliary liquid which is connected as a shunt off the hydraulic circuit, means for controlling the rate of flow of auxiliary fluid admitted into each of the shunt-connected dissipators, regulating means for regulating the circulation of the auxiliary liquid as a function of the random variations in energy of the natural fluid and safety means for withdrawing at least a part of the system from service when certain critical quantities exceed predetermined values, wherein the energy dissipator comprises means for converting the hydraulic energy of the auxiliary liquid to thermal energy and a heat exchanger for removing said thermal energy, and wherein the means for controlling the flow rate of auxiliary liquid admitted into an energy dissipator comprise a device having control valves which are calibrated in order to open automatically when the position of the means for adjusting the receivers which are connected to said dissipator is such that the entire flow of auxiliary liquid delivered by the emitters cannot flow through the receivers.

2. A system according to claim 1, wherein the safety means comprise a tachometric dynamo keyed on the generator shaft, the output signal of said dynamo being applied to a device for controlling an electric brake so arranged as to produce action on said shaft when the speed of the shaft exceeds a predetermined value.

3. A system according to claim 2, wherein the output signal of the tachometric dynamo is applied to a stage for controlling the regulating means of the receivers so as to place said means in a position of zero delivery of auxiliary liquid when the speed of the generator shaft exceeds a predetermined threshold value.

4. An application of a system as defined in claim 3 to a hydroelectric river power station.

5. A hydroelectric river power station according to claim 4 for drawing water from an upstream pond by means of a sluice-gate and restoring it into a downstream pond by means of at least one turbine transducer, an emitter which is keyed on the shaft of said transducer being connected through a hydraulic circuit to at least one receiver which is keyed on the shaft of an electric power generator, wherein the regulating means comprise in the case of each generator a power measuring stage connected at the output of the power generator, a differentiating stage for calculating the derivative of the power with respect to the speed of one of the turbines, a comparison stage for comparing the derivative aforesaid with zero, and a regulating device in which a difference signal input is connected to the output of the comparison stage and in which the action signal output is connected to the means for regulating the receiver which is connected to the turbine aforesaid.

6. A hydroelectric power station according to claim 5, wherein said power station comprises a device for measuring the level in the upstream pond and a comparison stage for comparing the measured level with a predetermined reference value, the output of said comparison stage being connected to a second difference signal input of the regulating device which is switchable with the first difference signal input.

7. A hydroelectric power station according to claim 6, wherein the level-difference signal is applied to means for controlling the sluice-gate in order to displace said gate by varying the reference value applied to the comparison stage.

8. A hydroelectric power station according to claim 6, wherein the output signal of the tachometric dynamo is applied to the means for controlling the sluice-gate in order to initiate closure of said gate when the speed of the shaft of the power generator exceeds a predetermined value.

9. A hydroelectric power station according to claim 6, wherein said station is equipped with a predetermined number of pressure gages for measuring the pressure of the auxiliary liquid in the hydraulic circuit, said pressure gages being provided with means for emitting a signal and being connected to the device for controlling the sluice-gate in order to initiate closure of said gate when the pressure in the hydraulic circuit falls below a predetermined threshold value.

10. An application of a system as defined in claim 2 to a wind-driven electric power station.

11. A wind-driven electric power station according to claim 10, comprising a predetermined number of windwheels and one emitter keyed on the shaft of each windwheel, said emitters being connected through a hydraulic circuit to a receiver which is keyed on the shaft of an electric power generator, wherein the regulating means comprise a pressure gage which is branched on the hydraulic circuit and emits a signal applied to a signal input of a regulating device provided with a reference-value display input in which the action signal is applied to a control stage for the regulating means of the receiver in order to maintain the pressure in the hydraulic circuit at a constant value by increasing the flow rate of auxiliary liquid in the receiver when the pressure aforesaid tends to increase, and wherein the control stage for the regulating means of the receiver comprises means for automatically putting said regulating means in the position of zero delivery of auxiliary liquid when said regulating means reach the position of maximum flow of auxiliary fluid.

12. A wind-driven electric power station according to claim 11, wherein the safety means comprise a threshold release and timing stage in which the inputs are connected to a generator temperature detector, to a generator speed detector and to a detector for the electric power produced by the generator and in which the output signal is applied by means of a reversing stage to the control stage for the regulating means of the receiver in order to put said means in a position of zero delivery of auxiliary fluid when the quantities measured by the detectors aforesaid exceed predetermined values during a predetermined period of time.

13. A wind-driven electric power station according to claim 12, wherein the safety means comprise an electric brake keyed on the shaft of each windwheel, the control input of said brake being connected to an anemometer which is placed in the proximity of the corresponding windwheel.

14. A wind-driven electric power station according to claim 13, wherein the anemometer is connected to the corresponding brake by means of a timing device.

15. A wind-driven electric power station according to claim 13, wherein the windwheels comprise a device for controlling the angle of inclination of the windwheel blades, said device being connected to the anemometer.

16. A wind-driven electric power station according to claim 13, wherein the safety means comprise a tachometric dynamo keyed on the shaft of each windwheel and connected to the corresponding brake.

17. A ship propulsion device comprising at least one windwheel and one emitter having a rotary hydraulic displacement pump which is keyed on the shaft of said windwheel, said emitter being connected to at least one receiver having a rotary hydraulic displacement motor through a hydraulic circuit in which an auxiliary liquid flows, a device for dissipating the energy of the auxiliary liquid which is connected as a shunt off the hydraulic circuit, means for controlling the rate of flow of auxiliary liquid admitted into the shunt connected dissipator device, regulating means for regulating the circulation of the auxiliary liquid as a function of the random variations in energy of the wind, safety means for withdrawing at least a part of the system from service when certain critical quantities exceed predetermined values, each receiver being keyed on the shaft of a propeller, wherein said device comprises two receivers which can be switched over to the emitter of said windwheel, each receiver aforesaid being keyed on the shaft of a propeller having different characteristics.

18. A device according to claim 17, wherein said device comprises an auxiliary heat engine on which is keyed an emitter, said emitter being connected to the hydraulic circuit which couples the emitters of the windwheels to the receivers of the propellers by means of a three-channel device.

19. A device according to claim 18, wherein the emitter which is keyed on the heat engine comprises regulating means for defining an adjustable relation between the speed of rotation of the engine and the rate of flow of auxiliary liquid through said emitter.

* * * * *